United States Patent Office 3,448,374
Patented June 3, 1969

3,448,374
BRIDGE-BALANCING DEVICES FOR SPEC-
TROMETERS FOR PARAMAGNETIC ELEC-
TRON RESONANCE
Klaus Heüer, Jena, Germany, assignor to
VEB Carl Zeiss Jena, Jena, Germany
Filed Aug. 29, 1966, Ser. No. 576,198
Int. Cl. G01n 27/78; H01p 7/06; G01r 27/04
U.S. Cl. 324—.5                                    2 Claims

ABSTRACT OF THE DISCLOSURE

A microwave bridge in a spectrometer for paramagnetic electron resonance includes a measuring resonator and a balancing resonator. The balancing resonator comprises three tuning elements for exact reproduction of the electric properties of the measuring resonator. The tuning elements are: A first dielectric pin with a reflection attenuating layer for changing the natural frequency of the balancing resonator, said pin being hollow to lessen detuning; a second dielectric pin for changing the quality factor of the balancing resonator; and a circular coupling iris. The two pins are displaceable along their longitudinal axes so as to immerse into the balancing resonator with changing lengths. The coupling coefficient of the balancing resonator and a wave guide attached thereto is changed by means of the circular coupling iris.

Figure 1:
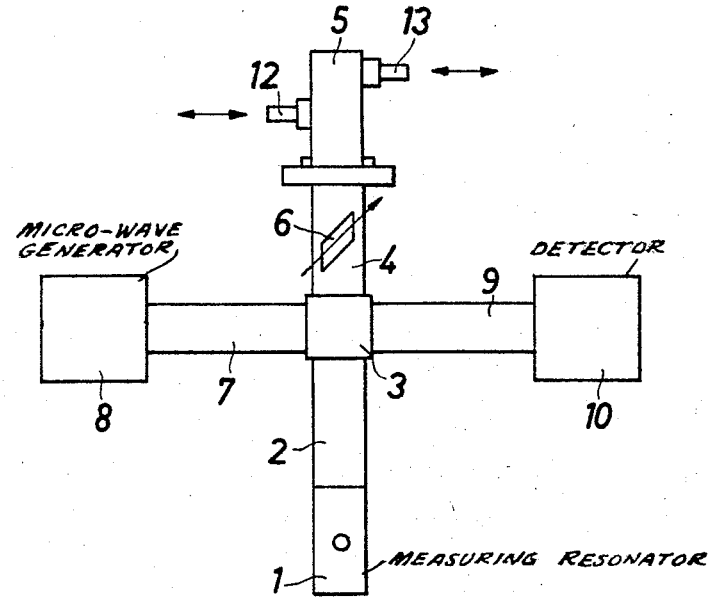

This invention relates to a bridge-balancing device for spectrometers for paramagnetic electron resonance.

Highly sensitive spectrometers of this kind require the generator frequency to be stabilised with utmost care, since frequency fluctuations are harmful to their accuracy. Good frequency constancy, however, is possible only in very complicated and somewhat bulky apparatus.

Bridge balance in spectrometers having paramagnetic electro resonance can be made independent of frequency in several known manner. A known spectrometer has, instead of a bridge, a resonator of particular construction with two orthogonal forms of vibration coupled to each other by means of a specimen, this kind of resonator being known as bimodal cavity. The said spectrometer requires the resonator to be adjusted for balance before every new measurement and suffers from the additional disadvantage that the resonator is of rather intricate construction.

Compensation has also been effected by means of a microwave bridge comprising two resonators. Tuning elements in the comparsion resonator make the quality factor and the resonance frequency of this resonator level with the respective magnitudes in the measuring resonator, but they do not make for perfect bridge balance.

It is an object of the present invention to provide a bridge-balancing device for spectrometers which can do without selectivity in bridge balancing and does not therefore require high frequency constancy, so that balance can be obtained in a reasonably simple way.

Accordingly, the invention consists in a bridge-balancing device for spectrometers having paramagnetic electron resonance, characterized in that to its measuring resonator is coordinated a balancing resonator which completely simulates the electric properties of the measuring resonator, the balance of the electrical length of the wave guide attached to the balancing resonator being effected in known manner by a phase shifter.

The balancing resonator has three tuning controls for respectively changing the resonance frequency, the quality factor, and the coefficient of coupling. The wall surrounding the cavity of the balancing resonator contains two dielectric pins which are displaceable along their axes, the pin for changing the quality factor having a surface layer for attenuating the reflection and being hollow to lessen detuning.

The coupling of the balancing resonator to the respective wave guide is effected by means of a coupling iris. Advantageously the coupling coefficient can be changed by rotating relatively to each other the polarization plane of the electromagnetic field in the balancing resonator and the polarization plane of the electromagnetic field in the wave guide, to which effect the balancing resonator is mounted on the said wave guide in such a manner as to be rotatable about an axis at right angles to the coupling iris.

Figure 2:
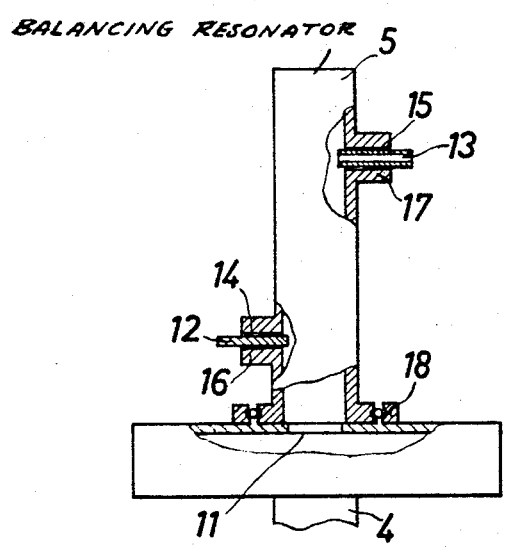

In order that the invention may be more readily understood, reference is made to the accompanying drawings which illustrate diagrammatically and by way of example one embodiment thereof, and in which:

FIG. 1 shows the bridge connections, and
FIG. 2 shows the balancing resonator.

In the drawings, a first wave guide 2, a coupling element 3 and a second wave guide 4 interconnect a measuring resonator 1 and a balancing resonator 5. The electric lengths of the wave guides 2 and 4 can be balanced by a phase shifter 6. A third wave guide 7 connects a generator 8 to the coupling element 3. A fourth wave guide 9 connects a detector 10 to the coupling element 3. The balancing resonator 5, for example a rectangular resonator, is coupled to the conductor 4 by means of a coupling iris 11. The natural frequency and the quality factor of the balancing resonator 5 can be changed respectively by dielectric pins 12 and 13 which are displaceable along their longitudinal axes. To attenuate reflection, the pin 13 is hollow and its exterior surface is coated by damping material. The pins 12 and 13 are located respectively in apertures 14 and 15 in the wall of the resonator 5, this wall being reinforced at the respective places in such a manner as to form bearings 16 and 17. The coupling can be changed by rotating the balancing resonator 5 relatively to the wave guide 4 by means of a ball bearing 18.

I claim:
1. A bridge-balancing device for spectrometers having paramagnetic electron resonance, comprising a measuring resonator for receiving the specimen, a balancing resonator, a coupling element, a first wave guide interconnecting said coupling element and said measuring resonator, a second wave guide interconnecting said coupling element and said balancing resonator, a phase shifter for balancing the electric length of said second wave guide, a microwave generator, a third wave guide interconnecting said generator and said coupling element, a detector for signals from said measuring resonator, and a fourth wave guide interconnecting said detector and said coupling element, wherein said balancing resonator is mounted on said second wave guide for rotation about an axis at right angles to a coupling iris, said iris being located between said balancing resonator and said second wave guide, the wall of said balancing resonator containing two apertures, a first dielectric pin which is hollow to lessen detuning, a reflection attenuating layer on said first dielectric pin, said first dielectric pin being mounted for displacement along its longitudinal axis in one of said apertures, and a second dielectric pin which is mounted for displacement along its longitudinal axis in the other of said apertures.

2. A device as claimed in claim 1, wherein said coupling iris is circular.

References Cited

UNITED STATES PATENTS

| | | | |
|---|---|---|---|
| 3,080,520 | 3/1963 | O'Reilly | 324—0.5 |
| 3,242,427 | 3/1966 | Kagan | 324—0.5 |
| 3,348,136 | 10/1967 | Nelson | 324—0.5 |

OTHER REFERENCES

Review of Scientific Instruments, vol. 32, No. 6, June 1961, pp. 658–661, Gordon.

RUDOLPH V. ROLINEC, *Primary Examiner.*

M. J. LYNCH, *Assistant Examiner.*

U.S. Cl. X.R.

324—58; 333—83